(12) United States Patent
Son et al.

(10) Patent No.: US 10,658,935 B2
(45) Date of Patent: May 19, 2020

(54) METHOD AND SYSTEM FOR CONTROLLING ON-BOARD CHARGER OF VEHICLE

(71) Applicants: Hyundai Motor Company, Seoul (KR); Kia Motors Corporation, Seoul (KR)

(72) Inventors: Gi Bong Son, Gyeonggi-do (KR); Hui Sung Jang, Gyeonggi-do (KR); Hyun Wook Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 15/810,520

(22) Filed: Nov. 13, 2017

(65) Prior Publication Data

US 2018/0351467 A1 Dec. 6, 2018

(30) Foreign Application Priority Data

Jun. 1, 2017 (KR) .......................... 10-2017-0068545

(51) Int. Cl.
*H02M 3/335* (2006.01)
*H02M 1/00* (2006.01)

(52) U.S. Cl.
CPC .................. *H02M 3/33569* (2013.01); *H02M 2001/0058* (2013.01)

(58) Field of Classification Search
CPC ........ Y02B 70/1433; H02M 3/335–42; H02M 2001/0054
See application file for complete search history.

(56) References Cited

U.S. PATENT DOCUMENTS

2018/0191168 A1* 7/2018 Banaska .................... G05F 1/12
2018/0191253 A1* 7/2018 Amoroso .......... H02M 3/33515

FOREIGN PATENT DOCUMENTS

KR  10-2015-0132792  11/2015

* cited by examiner

*Primary Examiner* — Daniel Kessie
*Assistant Examiner* — Peter M Novak
(74) *Attorney, Agent, or Firm* — Mintz Levin Cohn Ferris Glovsky and Popeo, P.C.; Peter F. Corless

(57) ABSTRACT

A method of controlling an on-board charger (OBC) and an OBC system are capable of improving efficiency of the OBC by controlling a DC link voltage such that a DC-DC LLC converter of an ecofriendly vehicle always operates at a resonance frequency. The method includes: detecting a switching turn-on time of a switching unit and a conduction time of a diode, comparing the switching turn-on time with the conduction time, comparing a point of time when the switching unit is turned on with a point of time when the diode becomes conductive, determining an operating frequency region of the switching unit, and controlling a voltage of an input terminal of the LLC converter such that a switching frequency of the switching unit is in a resonance frequency region of the LLC converter according to the determined operating frequency region.

16 Claims, 8 Drawing Sheets

METHOD AND SYSTEM FOR CONTROLLING ON-BOARD CHARGER OF VEHICLE

CROSS REFERENCE TO RELATED APPLICATION

The present application claims under 35 U.S.C. § 119(a) the benefit of Korean Patent Application No. 10-2017-0068545, filed Jun. 1, 2017, the entire contents of which are incorporated by reference herein.

BACKGROUND

1. Technical Field

The present disclosure relates to a method of controlling an on-board charger (OBC) of a vehicle and an OBC system. Specifically, to a method and system of controlling the OBC, which improves the efficiency of the OBC by controlling a DC link voltage such that a DC-DC LLC converter of an ecofriendly vehicle always operates at a resonance frequency.

2. Description of the Related Art

An ecofriendly vehicle such as a hybrid vehicle, an electric vehicle, etc. typically possesses an on-board charger (OBC). The OBC charges a high-voltage battery as a main battery and includes a power factor correction (PFC) unit or an LLC converter. The LLC converter generally has a resonance circuit (resonance tank) composed of resonance inductance $L_r$, magnetizing inductance $L_m$ and resonance capacitance $C_r$. The LLC converter reaches maximum efficiency when the resonant tank operates at a resonance frequency $f_o$.

Related arts utilized a DC link voltage variable map according to an output voltage (high-voltage battery voltage) to ensure the OBC operates (at a resonance frequency $f_o$ of a resonance network) at maximum efficiency. However, since an element value of a resonance network varies according to individual OBC samples, errors of magnetizing inductance $L_m$ and resonance inductance $L_r$ may be 15% or more according to the characteristics of a transformer. To this end, even when the DC link voltage variable map is set based on the design value of a representative sample, an input/output equation of the LLC converter is changed when errors are generated in the resonance tank. As a result, in the related art, the LLC converter is unable to operate at the resonance frequency $f_0$ capable of obtaining optimal efficiency and thus efficiency may vary depending on a particular sample. Further, efficiency of a specific sample may be decreased and electric efficiency of a vehicle may be reduced.

Accordingly, there is a solution for always operating an LLC converter at a resonance point even when element errors are generated in a resonance circuit (resonance tank) of the LLC converter.

The information disclosed in this section is merely for enhancement of understanding of the general background of the disclosure and should not be taken as an acknowledgment or any form of suggestion that the information forms the related art already known to a person skilled in the art.

SUMMARY

The present disclosure provides a method of controlling an OBC of a vehicle and an OBC system, which improves efficiency of the OBC by controlling a DC link voltage such that a DC-DC LLC converter of an ecofriendly vehicle always operates at a resonance frequency.

In accordance with an aspect of the present disclosure, a method is provided for controlling an on-board charger (OBC) of a vehicle, the OBC including an LLC converter having a switching unit and a resonance circuit at an input terminal thereof and a rectifier having a diode at an output terminal thereof. The method includes detecting a switching turn-on time of the switching unit and a conduction time of the diode of the rectifier; comparing the switching turn-on time of the switching unit with the conduction time of the diode of the rectifier, comparing a point of time at which the switching unit is turned on with a point of time at which the diode of the rectifier becomes conductive, and determining an operating frequency region of the switching unit; and controlling a voltage of the input terminal of the LLC converter such that a switching frequency of the switching unit is in a resonance frequency region of the LLC converter according to the determined operating frequency region.

The determining of the operating frequency region of the switching unit may include determining that the switching frequency is in a frequency region lower than a resonance frequency when the switching turn-on time of the switching unit is longer than the conduction time of the diode of the rectifier.

The controlling of the voltage of the input terminal of the LLC converter may include increasing the voltage of the input terminal of the LLC converter.

The determining of the operating frequency region of the switching unit may include determining whether the point of time when the switching unit is turned on is equal to the point of time at which the diode of the rectifier becomes conductive when the switching turn-on time of the switching unit is shorter than the conduction time of the diode of the rectifier and determining that the switching frequency is in the resonance frequency region when the point of time at which the switching unit is turned on is not equal to the point of time when the diode of the rectifier becomes conductive. The controlling of the voltage of the input terminal of the LLC converter may include operating the LLC converter without controlling the voltage of the input terminal of the LLC converter.

The determining of the operating frequency region of the switching unit may include determining whether the point of time at which the switching unit is turned on is equal to the point of time when the diode of the rectifier becomes conductive when the switching turn-on time of the switching unit is shorter than the conduction time of the diode of the rectifier and determining that the switching frequency is in a frequency region higher than a resonance frequency when the point of time at which the switching unit is turned on is equal to the point of time when the diode of the rectifier becomes conductive.

The controlling of the voltage of the input terminal of the LLC converter may include decreasing the voltage of the input terminal of the LLC converter.

After controlling the voltage of the input terminal of the LLC converter, the detecting of the switching turn-on time of the switching unit and the conduction time of the diode of the rectifier may be performed.

After controlling the voltage of the input terminal of the LLC converter, the LLC converter may operate when the switching turn-on time of the switching unit is shorter than the conduction time of the diode of the rectifier and the point of time at which the switching unit is turned on is not equal to the point of time when the diode of the rectifier becomes conductive.

In accordance with another aspect of the present disclosure an on-board charger (OBC) system of a vehicle is provided including an LLC converter having a switching unit and a resonance circuit at an input terminal thereof and including a rectifier having a diode at an output terminal thereof. Additionally, a controller may be configured to detect a switching turn-on time of the switching unit and a conduction time of the diode of the rectifier, compare the switching turn-on time of the switching unit with the conduction time of the diode of the rectifier, compare a point of time at which the switching unit is turned on with a point of time at which the diode of the rectifier becomes conductive, determine an operating frequency region of the switching unit, and control a voltage of the input terminal of the LLC converter such that a switching frequency of the switching unit is in a resonance frequency region of the LLC converter according to the determined operating frequency region.

The controller may determine that the switching frequency is in a frequency region lower than a resonance frequency to increase the voltage of the input terminal of the LLC converter, when the switching turn-on time of the switching unit is longer than the conduction time of the diode of the rectifier.

The controller may determine whether the point of time at which the switching unit is turned on is equal to the point of time at which the diode of the rectifier becomes conductive when the switching turn-on time of the switching unit is shorter than the conduction time of the diode of the rectifier. Additionally, the controller may determine that the switching frequency is in a resonance frequency region when the point of time at which the switching unit is turned on is not equal to the point of time at which the diode of the rectifier becomes conductive, and operate the LLC converter without controlling the voltage of the input terminal of the LLC converter.

The controller may determine whether the point of time at which the switching unit is turned on is equal to the point of time at which the diode of the rectifier becomes conductive when the switching turn-on time of the switching unit is shorter than the conduction time of the diode of the rectifier and determine that the switching frequency is in a frequency region higher than a resonance frequency to decrease the voltage of the input terminal of the LLC converter when the point of time at which the switching unit is turned on is equal to the point of time when the diode of the rectifier becomes conductive.

In accordance with another aspect of the present disclosure an on-board charger (OBC) system of a vehicle is provided including a power factor correction (PFC) unit configured to reduce reactive power of an AC voltage received from an external device and to convert the AC voltage into a DC voltage; and an LLC converter including a switching unit configured to receive the DC voltage output from the PFC unit and to output an AC voltage to a primary side of a transformer through switching. The transformer is configured to receive the AC voltage output from the switching unit at the primary side thereof, to control the level of the AC voltage and to output the AC voltage to a secondary side thereof, and a rectifier is configured to rectify the AC voltage output from the secondary side of the transformer and to output a DC voltage.

The system further includes a controller configured to detect a switching turn-on time of the switching unit and a conduction time of the diode of the rectifier, to compare the switching turn-on time of the switching unit with the conduction time of the diode of the rectifier, to compare a point of time at which the switching unit is turned on with a point of time at which the diode of the rectifier becomes conductive, to determine an operating frequency region of the switching unit, and to control a voltage of the input terminal of the LLC converter such that a switching frequency of the switching unit is in a resonance frequency region of the LLC converter according to the determined operating frequency region.

The switching unit of the LLC converter may include first and second switches each having one side connected to an output terminal of the PFC unit and the other side connected to a resonance circuit. The rectifier may include first and second diodes each having one side connected to the secondary side of the transformer and the other side connected to the output terminal of the LLC converter.

The controller may detect the switching turn-on times of the first and second switches and the conduction times of the first and second diodes of the rectifier, compare the switching turn-on time of the first switch with the conduction time of the first diode and compare the point of time at which the first switch is turned on with the point of time at which the first diode becomes conductive to determine an operating frequency region of the switching region or compare the switching turn-on time of the second switch with the conduction time of the second diode and compare the point of time at which the second switch is turned on with the point of time at which the second diode becomes conductive to determine the operating frequency region of the switching unit, and control the voltage of the input terminal of the LLC converter such that the switching frequency of the switching unit is in the resonance frequency region of the LLC converter.

The controller may determine that the switching frequency is in a frequency region lower than the resonance frequency to increase the voltage of the input terminal of the LLC converter when the switching turn-on time of the switching unit is longer than the conduction time of the diode of the rectifier. Additionally, the controller may determine that the switching frequency is in the resonance frequency region not to control the voltage of the input terminal of the LLC converter when the switching turn-on time of the switching unit is shorter than the conduction time of the diode of the rectifier and the point of time at which the switching unit is turned on is not equal to the point of time when the diode of the rectifier becomes conductive, and determine that the switching frequency is in a frequency region higher than the resonance frequency to decrease the voltage of the input terminal of the LLC converter when the switching turn-on time of the switching unit is shorter than the conduction time of the diode and the point of time at which the switching unit is turned on is equal to the point of time when the diode of the rectifier becomes conductive.

In the method of controlling the OBC of the vehicle and the OBC system according to the present disclosure, the DC link voltage which is the voltage of the input terminal of the LLC converter 100 is controlled such that the LLC converter always operates at the resonance frequency, thereby improving efficiency of the OBC.

In addition, efficiency of the OBC increases, improving the electric efficiency of the vehicle.

In addition, a difference in efficiency between samples can be reduced and the electric efficiency of the vehicle can increase, decreasing charging time. Therefore, quality can be improved.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, methods of controlling an on-board charger (OBC) of a vehicle and OBC systems according to various embodiments of the present disclosure will be described in detail with reference to the accompanying drawings.

Figure 1:
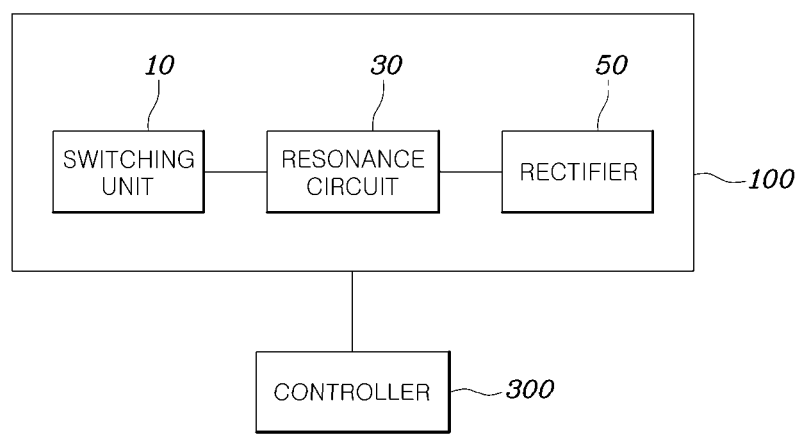
FIG. 1 is a block diagram showing the configuration of an on-board charger (OBC) system of a vehicle according to an embodiment of the present disclosure.
Figure 2:
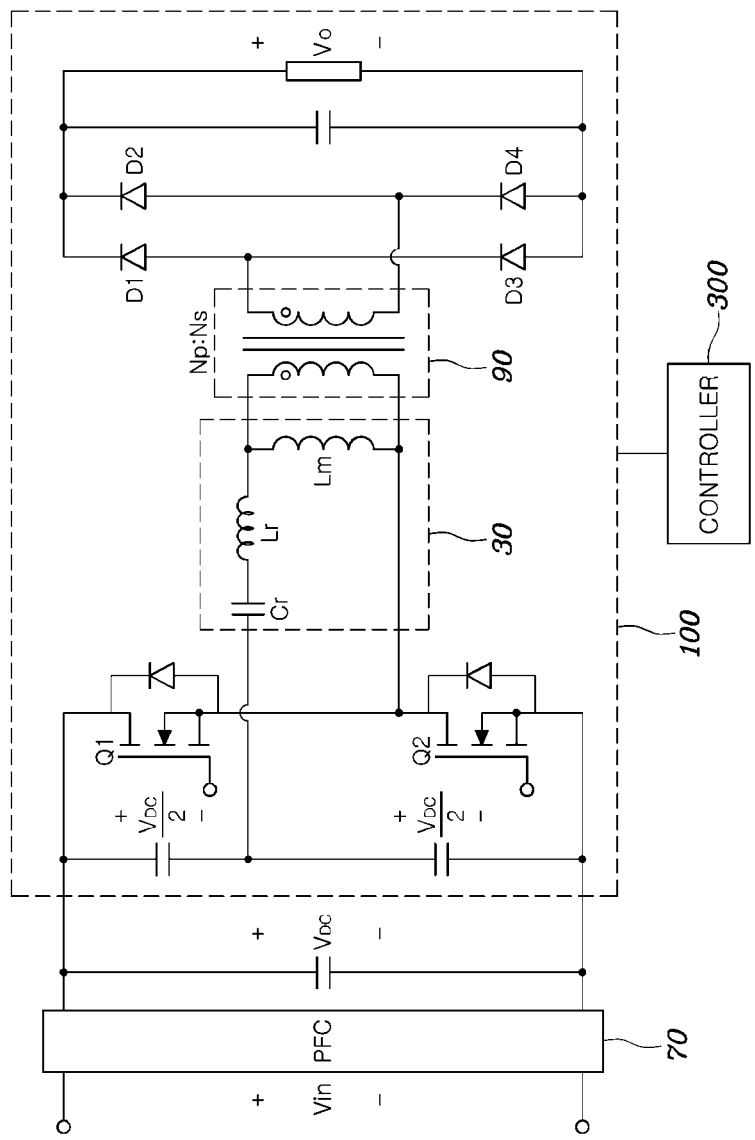
FIG. 2 is a circuit diagram of the configuration of the OBC system of FIG. 1.
Figure 3:
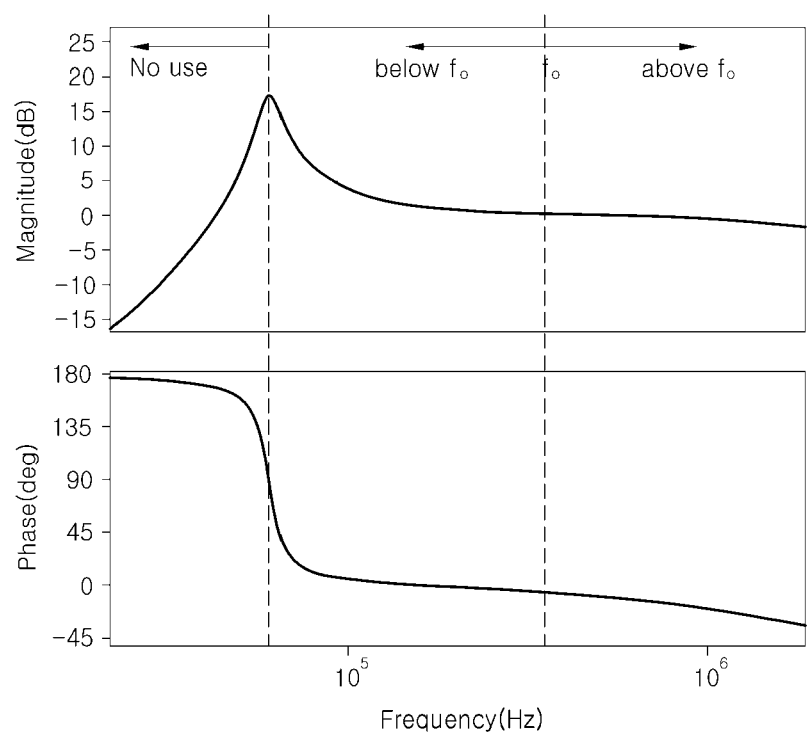
FIG. 3 is a graph of a transfer function of an LLC converter of the OBC system based on frequency according to an embodiment of the present disclosure.
Figure 4:
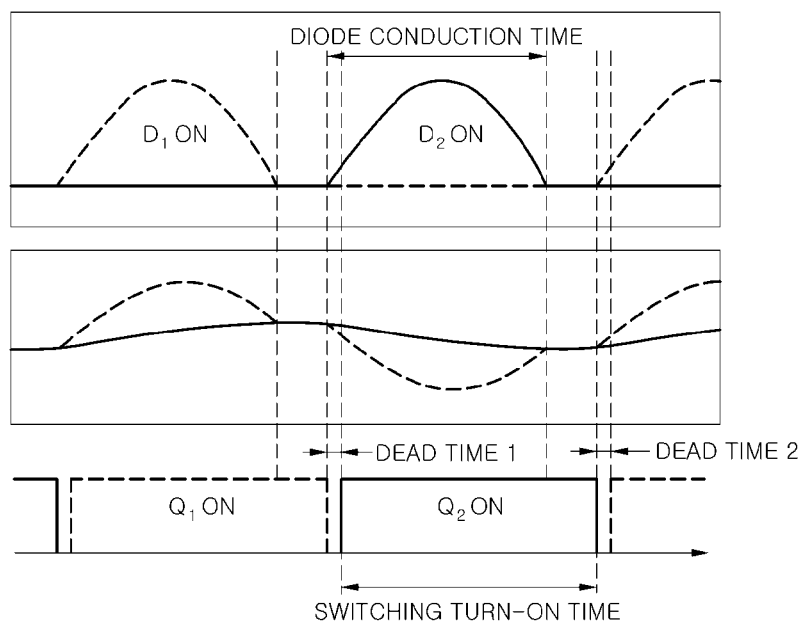
FIGS. 4 to 6 are diagrams showing the conduction properties of a diode at an output terminal of an LLC converter according to a switching frequency of an OBC system of a vehicle according to an embodiment of the present disclosure.
Figure 5:
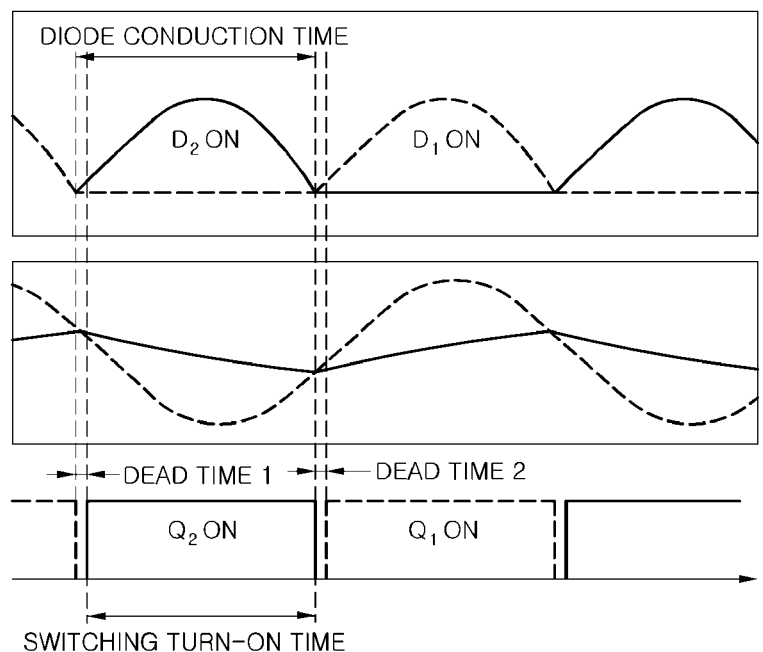
Figure 6:
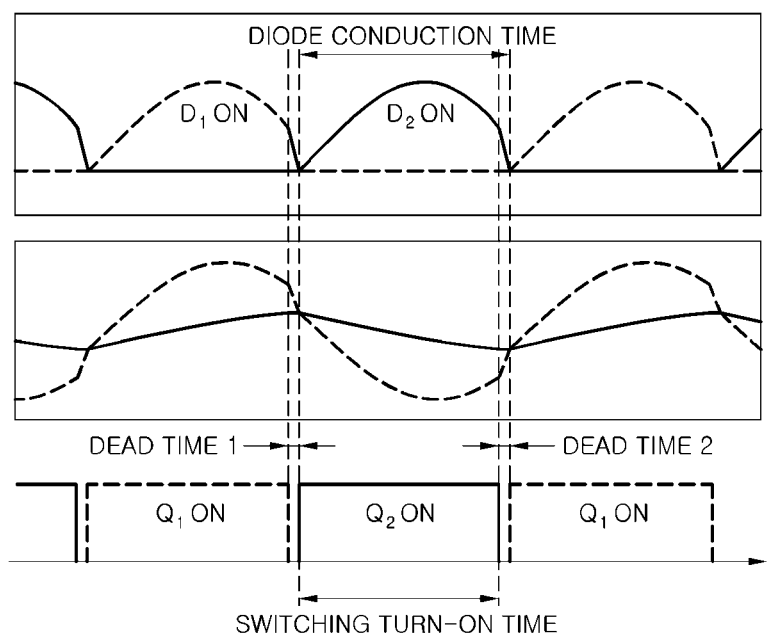
Figure 7:
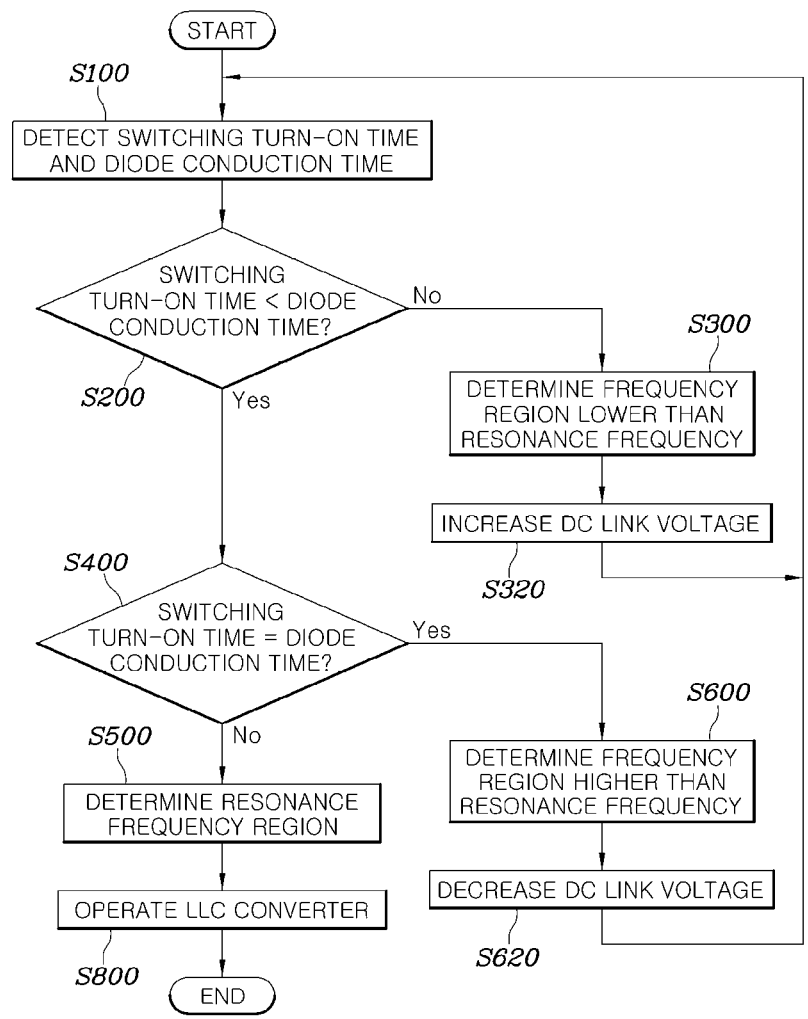
FIGS. 7 and 8 are flowcharts illustrating a method of controlling an OBC of a vehicle according to an embodiment of the present disclosure.
Figure 8:
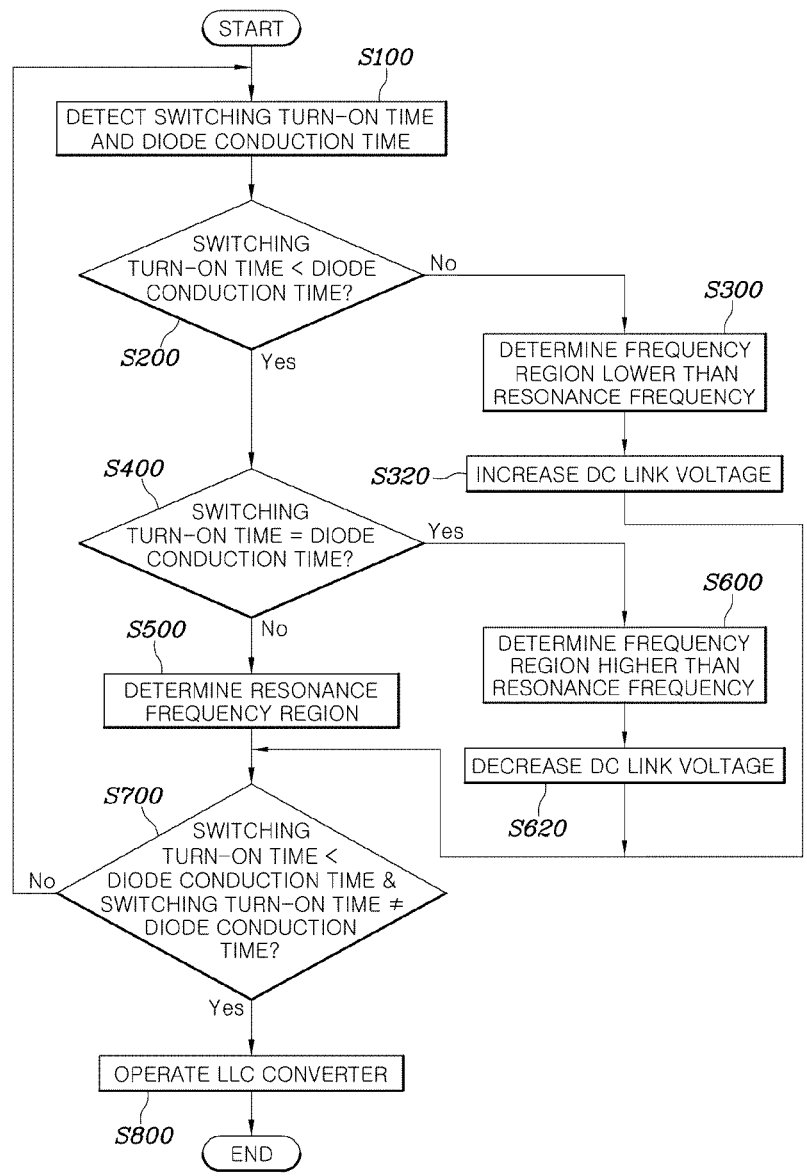

FIG. 1 is a block diagram and FIG. 2 is a circuit diagram of an on-board charger (OBC) system of a vehicle according to an embodiment of the present disclosure, FIG. 3 is a graph of a transfer function of an LLC converter of an OBC system based on frequency according to an embodiment of the present disclosure, FIGS. 4 to 6 are diagrams showing the conduction properties of a diode at an output terminal of an LLC converter according to a switching frequency of an OBC system of a vehicle according to an embodiment of the present disclosure, and FIGS. 7 and 8 are flowcharts illustrating a method of controlling an OBC of a vehicle according to an embodiment of the present disclosure.

Referring to FIG. 1, the OBC system of the vehicle according to the embodiment of the present disclosure may include an LLC converter 100 having a switching unit 10 and a resonance circuit 30 at an input terminal thereof and including a rectifier 50 composed of a diode at an output side thereof, and a controller 300 configured to detect a switching turn-on time of the switching unit 10 and a conduction time of the diode of the rectifier 50. The controller is further configured to compare the switching turn-on time of the switching unit 10 with the conduction time of the diode of the rectifier 50, to compare a point of time at which the switching unit 10 is turned on with a point of time at which the diode of the rectifier 50 becomes conductive to determine an operating frequency region of the switching unit 10, and to control the voltage of the input terminal of the LLC converter 100 according to the determined operating frequency region such that the switching frequency of the switching unit 10 is in the resonance frequency region of the LLC converter 100.

The controller 300 may determine that the switching frequency is in a frequency region lower than the resonance frequency to increase the voltage at the input terminal of the LLC converter 100, when the switching turn-on time of the switching unit 10 is longer than the conduction time of the diode of the rectifier 50. The controller 300 may determine whether the point of time at which the switching unit 10 is turned on is equal to the point of time at which the diode of the rectifier 50 becomes conductive, when the switching turn-on time of the switching unit 10 is shorter than the conduction time of the diode of the rectifier 50. Additionally, the controller may determine that the switching frequency is in the resonance frequency region to operate the LLC converter 100 without controlling the voltage of the input terminal of the LLC converter 100, when the point of time at which the switching unit 10 is turned on is not equal to the point of time at which the diode of the rectifier 50 becomes conductive. In addition, the controller 300 may determine whether the point of time at which the switching unit 10 is turned on is equal to the point of time at which the diode of the rectifier 50 becomes conductive, when the switching turn-on time of the switching unit 10 is shorter than the conduction time of the diode of the rectifier 50. The controller may also determine that the switching frequency is in a frequency region higher than the resonance frequency to reduce the voltage of the input terminal of the LLC converter 100, when the point of time at which the switching unit 10 is turned on is equal to the point of time at which the diode of the rectifier 50 becomes conductive.

Referring to FIG. 2, the OBC system of the vehicle according to the embodiment of the present disclosure may include a power factor correction (PFC) unit 70 configured to reduce reactive power of an AC voltage received from an external device, to convert the AC power into a DC voltage and to output the DC voltage. An LLC converter 100 of the system includes a switching unit 10 configured to receive the DC voltage output from the PFC unit 70 and to output an AC voltage to the primary side of a transformer 90 through switching, the transformer 90 configured to receive the AC voltage output from the switching unit 10 at the primary side thereof, to control the level of the voltage and to output the voltage at a secondary side thereof.

The system also includes rectifier 50 configured to rectify the AC voltage output from the secondary side of the transformer 90 and to output a DC voltage; and the controller 300 configured to detect the switching turn-on time of the switching unit 10 and the conduction time of the diode of the rectifier 50, to compare the switching turn-on time of the switching unit 10 with the conduction time of the diode of the rectifier 50, to compare the point of time at which the switching unit 10 is turned on with the point of time at which the diode of the rectifier 50 becomes conductive to determine the operating frequency region of the switching unit 10, and to control the voltage of the input terminal of the LLC converter 100 according to the determined operating frequency region such that the switching frequency of the switching unit 10 is in the resonance frequency region of the LLC converter 100.

In particular, the PFC unit may be a boost PFC unit capable of obtaining an output voltage greater than an input voltage in an embodiment of the present disclosure. The switching unit 10 of the LLC converter 100 may have first and second switches Q1 and Q2 each having one side connected to an output terminal of the PFC unit 70 and the other side connected to the resonance circuit 30. The rectifier 50 may include first and second diodes D1 and D2 each having one side connected to the secondary side of the transformer 90 and the other side connected to an output terminal of the LLC converter 100.

The controller 300 may detect the turn-on times of the first and second switches Q1 and Q2 of the switching unit 10 and the conduction times of the first and second diodes D1 and D2 of the rectifier 50, compare the turn-on time of the first switch Q1 with the conduction time of the first diode D1 and compare the point of time at which the first switch Q1 is turned on with the point of time at which the first diode D1 becomes conductive to determine the operating frequency region of the switching unit 10. Alternatively, the controller may compare the turn-on time of the second switch Q2 with the conduction time of the second diode D2 and compare the point of time at which the second switch Q2 is turned on with the point of time at which the second diode D2 becomes conductive to determine the operating frequency region of the switching unit 10. The controller may control the voltage of the input terminal of the LLC converter 100 such that the switching frequency of the switching unit 10 is in the resonance frequency region of the LLC converter 100.

The controller 300 may determine that the switching frequency is in the frequency region lower than the resonance frequency to increase the voltage of the input terminal of the LLC converter 100 when the switching turn-on time of the switching unit 10 is longer than the conduction time of the diode of the rectifier 50 and determine that the switching frequency is in the resonance frequency region not to control the voltage of the input terminal of the LLC converter 100 when the switching turn-on time of the switching unit 10 is shorter than the conduction time of the diode of the rectifier 50 and the point of time at which the switching unit 10 is turned on is not equal to the point of time at which the diode of the rectifier 50 becomes conductive. The control may determine that the switching frequency is in the frequency region higher than the resonance frequency to increase the voltage of the input terminal of the LLC converter 100 when the switching turn-on time of the switching unit 10 is shorter than the conduction time of the diode of the rectifier 50 and the point of time at which the switching unit 10 is turned on is equal to the point of time at which the diode of the rectifier 50 becomes conductive.

Referring to FIG. 3, a region lower than the resonance frequency $f_o$ of the resonance circuit 30 of the LLC converter 100 is referred to as a below resonance region and a region higher than the resonance frequency is referred to as an above resonance region. Gain of an output voltage to an input voltage of the LLC converter is determined depending on to which region the switching frequency belongs. As shown in FIG. 3, when the switching frequency becomes less than the resonance frequency $f_o$, gain increases (except for a no-use part). At this time, when the DC link voltage $V_{DC}$ which is the voltage of the input terminal of the LLC converter 100 increases, the switching frequency of the LLC converter increases.

In contrast, when the switching frequency becomes greater than the resonance frequency $f_o$, gain decreases. At this time, when the DC link voltage $V_{DC}$ which is the voltage of the input terminal of the LLC converter 100 decreases, the switching frequency of the LLC converter decreases. In the $V_o/V_{DC}$ transfer function of the LLC converter, since the $V_o$ value is a battery charging voltage and is fixed, the DC link voltage $V_{DC}$, which is the voltage of the input terminal of the LLC converter 100, may be controlled in the below resonance region and the above resonance region, such that the switching frequency of the LLC converter is always the resonance frequency. Therefore, it is possible to improve efficiency of the OBC and to increase the electric efficiency of the vehicle.

FIGS. 4 to 6 show current of the resonance circuit 30 and current of the diode of the rectifier 50 in the switching region. It can be seen that the conduction time of the diode is changed according to operating region and a relation between the conduction property of the diode of the rectifier 50 and the switching frequency of the switching unit 10 in each frequency region is confirmed. More specifically, FIG. 4 shows operation of the LLC converter 100 in the below resonance region lower than the resonance frequency, where the switching turn-on time of the switching unit is longer than the conduction time of the diode.

FIG. 5 shows operation of the LLC converter 100 in the resonance frequency region, and FIG. 6 shows operation of the LLC converter 100 in the above resonance region higher than the resonance frequency. It can be seen that the switching turn-on time of the switching unit is shorter than the conduction time of the diode and a sum of the switching turn-on time and the dead time is equal to the conduction time of the diode. The point of time at which the switching unit 10 is turned on and the point of time at which the diode of the rectifier 50 becomes conductive are equal in the above resonance region higher than the resonance frequency but are not equal in the resonance frequency region.

In the present disclosure, the LLC converter 100 always operates at the resonance frequency using the conduction property of the diode according to such a switching frequency.

Hereinafter, a method of controlling an OBC of a vehicle according to an embodiment of the present disclosure will be described.

Referring to FIG. 7, the method of controlling the OBC of the vehicle, which includes the LLC converter having the switching unit and the resonance circuit at the input terminal thereof and a rectifier having the diode at the output terminal thereof, according to the embodiment of the present disclosure may include detecting the switching turn-on time of the switching unit and the conduction time of the diode of the rectifier (S100). Additionally, the method include comparing the switching turn-on time of the switching unit with the conduction time of the diode of the rectifier and comparing the point of time at which the switching unit is turned on with the point of time at which the diode of the rectifier becomes conductive to determine the operating frequency region of the switching unit (S200 and S400); and controlling the voltage of the input terminal of the LLC converter such that the switching frequency of the switching unit is in the resonance frequency region of the LLC converter according to the determined operating frequency region (S320 and S620).

In step S100 of detecting the switching turn-on time of the switching unit and the conduction time of the diode of the rectifier, the controller may monitor the switching turn-on time of the switching unit, the point of time at which the switching unit is turned on, the conduction time of the diode of the rectifier, the point of time at which the diode becomes conductive, and the DC link voltage $V_DC$ which is the voltage of the input terminal of the LLC converter. In the embodiment of the present disclosure, referring to FIG. 2, the switching turn-on time of the switching unit and the conduction time of the diode of the rectifier may be the turn-on times of the first and second switches Q1 and Q2 of the switching unit and the conduction times of the first and second diodes D1 and D2 of the rectifier and the point of time at which the switching unit is turned on and the point of time at which the diode of the rectifier becomes conductive may be the point of time at which the first and second switches Q1 and Q2 of the switching unit are turned on and the point of time at which the first and second diodes D1 and D2 of the rectifier are conducted.

In steps S200 and S400 of determining the operating frequency region of the switching unit, the switching turn-on time of the switching unit and the conduction time of the diode of the rectifier detected in step S100 and the point of time at which the switching unit is turned on and the point of time at which the diode of the rectifier becomes conductive are compared to determine in which frequency region the LLC converter operates.

In particular, referring to FIG. 2, the switching turn-on time of the first switch Q1 of the switching unit and the conduction time of the first diode D1 of the rectifier are compared and the point of time at which the first switch Q1 of the switching unit is turned on and the point of time at which the first diode D1 of the rectifier becomes conductive are compared to determine the operating frequency region of the switching unit or the switching turn-on time of the second switch Q2 of the switching unit. Additionally, the conduction time of the second diode D2 of the rectifier are compared and the point of time at which the second switch Q2 of the switching unit is turned on and the point of time at which the second diode D2 of the rectifier becomes conductive are compared to determine the operating frequency region of the switching unit.

More specifically, when the switching turn-on time of the switching unit is longer than the conduction time of the diode of the rectifier, it may be determined that the switching frequency is in the frequency region lower than the resonance frequency (S300). When the switching turn-on time of the switching unit is shorter than the conduction time of the diode of the rectifier, a determination as to whether the point of time at which the switching unit is turned on is equal to the point of time at which the diode of the rectifier becomes conductive is made (S400). It may be determined that the switching frequency is in the resonance frequency region (S500) when the point of time at which the switching unit is turned on is not equal to the point of time at which the diode of the rectifier becomes conductive. Additionally, it may be determined that the switching frequency is in the frequency region higher than the resonance frequency (S600) when the point of time at which the switching unit is turned on is equal to the point of time at which the diode of the rectifier becomes conductive.

In steps S320 and S620 of controlling the voltage of the input terminal of the LLC converter, the DC link voltage $V_DC$ which is the voltage of the input terminal of the LLC converter is controlled such that the LLC converter operates in the resonance frequency region according to the determined operating frequency region.

More specifically, the voltage of the input terminal of the LLC converter increases upon determining that the operating frequency region of the switching unit is lower than the resonance frequency and decreases upon determining that the operating frequency region of the switching unit is higher than the resonance frequency. Then, the step of detecting the switching turn-on time of the switching unit and the conduction time of the diode of the rectifier is performed to determine whether the operating properties obtained when the LLC converter operates in the resonance frequency region are detected. By repeatedly increasing or decreasing the voltage of the input terminal of the LLC converter according to the operating frequency region of the switching unit, it is possible to improve efficiency of the OBC such that the LLC converter always operates in the resonance frequency region. In addition, a difference in efficiency between samples can be reduced and the electric efficiency of the vehicle can increase to decrease a charging time. Therefore, quality can be improved.

Meanwhile, upon determining that the operating frequency region of the switching unit is in the resonance frequency region, the LLC converter operates without controlling the voltage of the input terminal of the LLC converter (S800).

Referring to FIG. 8, after the steps of determining whether the operating frequency region of the switching unit is lower or higher than the resonance frequency and controlling the voltage of the input terminal of the LLC converter, in one embodiment of the present disclosure, when the switching turn-on time of the switching unit is shorter than the conduction time of the diode of the rectifier and the point of time at which the switching unit is turned on is not equal to the point of time at which the diode of the rectifier becomes conductive, the LLC converter may operate (S700).

As described above, in the method of controlling the OBC of the vehicle and the OBC system according to various embodiments of the present disclosure, the DC link voltage which is the voltage of the input terminal of the LLC converter 100 is controlled such that the LLC converter always operates at the resonance frequency, thereby improving efficiency of the OBC.

In addition, efficiency of the OBC increases, improving the electric efficiency of the vehicle.

In addition, a difference in efficiency between samples can be reduced and the electric efficiency of the vehicle can increase, decreasing charging time. Therefore, quality can be improved.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of controlling an on-board charger (OBC) of a vehicle, the OBC including an LLC converter including a switching unit and a resonance circuit at an input terminal thereof and a rectifier including a diode at an output terminal thereof, the method comprising:
   detecting, by a controller, a switching turn-on time of the switching unit and a conduction time of the diode of the rectifier;
   comparing, by the controller, the switching turn-on time of the switching unit with the conduction time of the diode of the rectifier, comparing a point of time when the switching unit is turned on with a point of time when the diode of the rectifier becomes conductive, and determining, by the controller, an operating frequency region of the switching unit; and
   controlling, by the controller, a voltage of the input terminal of the LLC converter such that a switching frequency of the switching unit is in a resonance frequency region of the LLC converter according to the determined operating frequency region,
   wherein the determining of the operating frequency region of the switching unit includes determining whether the point of time when the switching unit is turned on is equal to the point of time when the diode of the rectifier becomes conductive when the switching turn-on time of the switching unit is shorter than the conduction time of the diode of the rectifier and determining that the switching frequency is in the resonance frequency region when the point of time when the switching unit is turned on is not equal to the point of time when the diode of the rectifier becomes conductive.

2. The method according to claim 1, wherein the determining of the operating frequency region of the switching unit includes determining that the switching frequency is in a frequency region lower than a resonance frequency when the switching turn-on time of the switching unit is longer than the conduction time of the diode of the rectifier.

3. The method according to claim 2, wherein the controlling of the voltage of the input terminal of the LLC converter includes increasing the voltage of the input terminal of the LLC converter.

4. The method according to claim 3, wherein, after the controlling of the voltage of the input terminal of the LLC converter, the detecting of the switching turn-on time of the switching unit and the conduction time of the diode of the rectifier is performed.

5. The method according to claim 3, wherein, after the controlling of the voltage of the input terminal of the LLC converter, the LLC converter operates when the switching turn-on time of the switching unit is shorter than the conduction time of the diode of the rectifier and the point of time when the switching unit is turned on is not equal to the point of time when the diode of the rectifier becomes conductive.

6. The method according to claim 1, wherein the determining of the operating frequency region of the switching unit includes determining whether the point of time when the switching unit is turned on is equal to the point of time when the diode of the rectifier becomes conductive when the switching turn-on time of the switching unit is shorter than the conduction time of the diode of the rectifier and determining that the switching frequency is in a frequency region higher than a resonance frequency when the point of time when the switching unit is turned on is equal to the point of time when the diode of the rectifier becomes conductive.

7. The method according to claim 6, wherein the controlling of the voltage of the input terminal of the LLC converter includes decreasing the voltage of the input terminal of the LLC converter.

8. The method according to claim 7, wherein, after the controlling of the voltage of the input terminal of the LLC converter, the detecting of the switching turn-on time of the switching unit and the conduction time of the diode of the rectifier is performed.

9. The method according to claim 7, wherein, after the controlling of the voltage of the input terminal of the LLC converter, the LLC converter operates when the switching turn-on time of the switching unit is shorter than the conduction time of the diode of the rectifier and the point of time when the switching unit is turned on is not equal to the point of time when the diode of the rectifier becomes conductive.

10. An on-board charger (OBC) system of a vehicle, the OBC system comprising:
    an LLC converter including a switching unit and a resonance circuit at an input terminal thereof and including a rectifier including a diode at an output terminal thereof; and
    a controller configured to detect a switching turn-on time of the switching unit and a conduction time of the diode of the rectifier, to compare the switching turn-on time of the switching unit with the conduction time of the diode of the rectifier, to compare a point of time when the switching unit is turned on with a point of time when the diode of the rectifier becomes conductive, to determine an operating frequency region of the switching unit, and to control a voltage of the input terminal of the LLC converter such that a switching frequency of the switching unit is in a resonance frequency region of the LLC converter according to the determined operating frequency region,
    wherein the controller determines whether the point of time when the switching unit is turned on is equal to the point of time when the diode of the rectifier becomes conductive when the switching turn-on time of the switching unit is shorter than the conduction time of the diode of the rectifier, determines that the switching frequency is in a resonance frequency region when the point of time when the switching unit is turned on is not equal to the point of time when the diode of the rectifier becomes conductive.

11. The OBC system according to claim 10, wherein the controller determines that the switching frequency is in a frequency region lower than a resonance frequency to increase the voltage of the input terminal of the LLC converter, when the switching turn-on time of the switching unit is longer than the conduction time of the diode of the rectifier.

12. The OBC system according to claim 10, wherein the controller operates the LLC converter without controlling the voltage of the input terminal of the LLC converter.

13. The OBC system according to claim 10, wherein the controller determines whether the point of time when the switching unit is turned on is equal to the point of time when the diode of the rectifier becomes conductive when the switching turn-on time of the switching unit is shorter than the conduction time of the diode of the rectifier and determines that the switching frequency is in a frequency region higher than a resonance frequency to decrease the voltage of the input terminal of the LLC converter when the point of time when the switching unit is turned on is equal to the point of time when the diode of the rectifier becomes conductive.

14. An on-board charger (OBC) system of a vehicle, the OBC system comprising:
  a power factor correction (PFC) unit configured to reduce reactive power of an AC voltage received from an external device and to convert the AC voltage into a DC voltage;
  an LLC converter including a switching unit configured to receive the DC voltage output from the PFC unit and to output an AC voltage to a primary side of a transformer through switching, the transformer being configured to receive the AC voltage output from the switching unit at the primary side thereof, to control the level of the AC voltage and to output the AC voltage to a secondary side thereof, and a rectifier configured to rectify the AC voltage output from the secondary side of the transformer and to output a DC voltage; and
  a controller configured to detect a switching turn-on time of the switching unit and a conduction time of the diode of the rectifier, to compare the switching turn-on time of the switching unit with the conduction time of the diode of the rectifier, to compare a point of time when the switching unit is turned on with a point of time when the diode of the rectifier becomes conductive, to determine an operating frequency region of the switching unit, and to control a voltage of the input terminal of the LLC converter such that a switching frequency of the switching unit is in a resonance frequency region of the LLC converter according to the determined operating frequency region,
  wherein the controller determines that the switching frequency is in the resonance frequency region not to control the voltage of the input terminal of the LLC converter when the switching turn-on time of the switching unit is shorter than the conduction time of the diode of the rectifier and the point of time when the switching unit is turned on is not equal to the point of time when the diode of the rectifier becomes conductive.

15. The OBC system according to claim 14,
  wherein the switching unit of the LLC converter includes first and second switches each having one side connected to an output terminal of the PFC unit and the other side connected to a resonance circuit and the rectifier includes first and second diodes each having one side connected to the secondary side of the transformer and the other side connected to the output terminal of the LLC converter, and
  wherein the controller detects the switching turn-on times of the first and second switches and the conduction times of the first and second diodes of the rectifier, compares the switching turn-on time of the first switch with the conduction time of the first diode and compares the point of time when the first switch is turned on with the point of time when the first diode becomes conductive to determine an operating frequency region of the switching region or compares the switching turn-on time of the second switch with the conduction time of the second diode and compares the point of time when the second switch is turned on with the point of time when the second diode becomes conductive to determine the operating frequency region of the switching unit, and controls the voltage of the input terminal of the LLC converter such that the switching frequency of the switching unit is in the resonance frequency region of the LLC converter.

16. The OBC system according to claim 15, wherein the controller determines that the switching frequency is in a frequency region lower than the resonance frequency to increase the voltage of the input terminal of the LLC converter when the switching turn-on time of the switching unit is longer than the conduction time of the diode of the rectifier and determines that the switching frequency is in a frequency region higher than the resonance frequency to decrease the voltage of the input terminal of the LLC converter when the switching turn-on time of the switching unit is shorter than the conduction time of the diode and the point of time when the switching unit is turned on is equal to the point of time when the diode of the rectifier becomes conductive.

* * * * *